Nov. 1, 1955    C. F. HENNEY    2,722,106
REFRIGERATING APPARATUS FOR AN AUTOMOBILE
Filed May 4, 1950    2 Sheets-Sheet 1

Nov. 1, 1955    C. F. HENNEY    2,722,106
REFRIGERATING APPARATUS FOR AN AUTOMOBILE
Filed May 4, 1950    2 Sheets-Sheet 2

INVENTOR.
Charles F. Henney
BY
Willits Hardman and Fehr
Attorneys

United States Patent Office 2,722,106
Patented Nov. 1, 1955

2,722,106

REFRIGERATING APPARATUS FOR AN AUTOMOBILE

Charles F. Henney, Dayton, Ohio, assignor to General Motors Corporation, Dayton, Ohio, a corporation of Delaware Application May 4, 1950, Serial No. 159,978

6 Claims. (Cl. 62—6)

This invention is related in a general way to refrigerating apparatus, but more particularly to air conditioning systems for automobiles.

It is an object of my invention to provide an air conditioning system which will provide a uniformly distributed comfortable temperature without drafts upon the occupants seated in the automobile.

It is another object of my invention to provide a separate air circulating system for the front of the automobile containing the front seat and a separate air circulating system for the rear of the automobile containing the rear seat.

It is another object of my invention to provide an air conditioning system which can be readily installed in a conventional automobile without interfering with the normal use or repair of the automobile and without requiring any major changes.

These objects are attained by providing beneath the front seat one air cooling unit which draws in air from in front of the seat and discharges the air forwardly at one end of the seat. A second air cooling unit is provided for drawing air from the rear of the front seat and discharges this air laterally at the rear face of the front seat.

Further objects and advantages of the present invention will be apparent from the following description, reference being had to the accompanying drawings, wherein a preferred form of the present invention is clearly shown.

Figure 1:
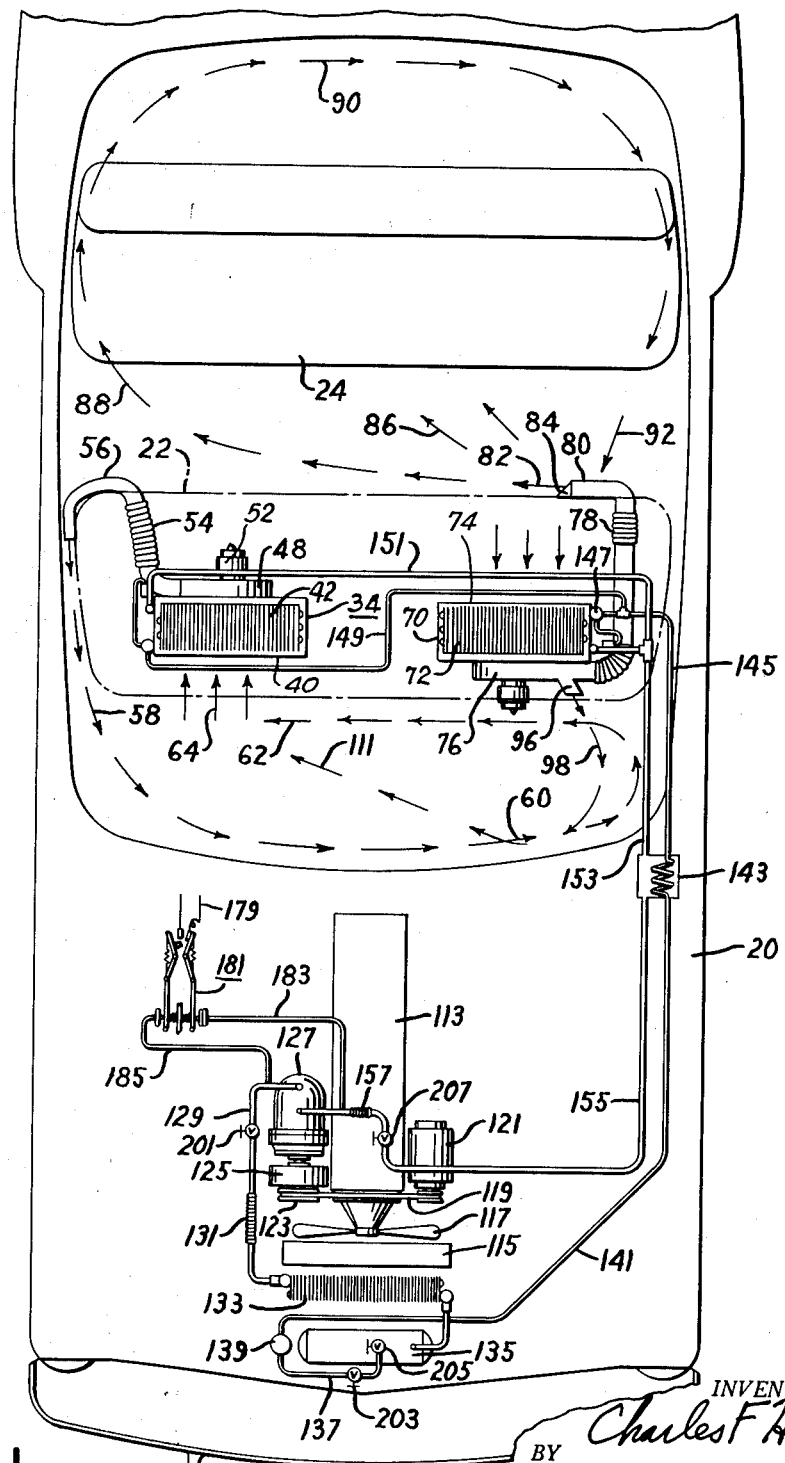
Fig. 1 is a diagrammatic view of an automobile provided with my air conditioning system.

Referring now to the drawings and more particularly Fig. 1, there is shown diagrammatically a conventional six passenger motor car 20 having a passenger compartment containing a front seat 22 for a driver and two passengers and a rear seat 24 for three passengers. The bottom portion of the front seat 22 is provided with a raised portion 26 extending nearly from one end of the seat to the other. The car is provided with an X-type frame which includes the side rails 28 and 30 and the X member 32.

Figure 4:
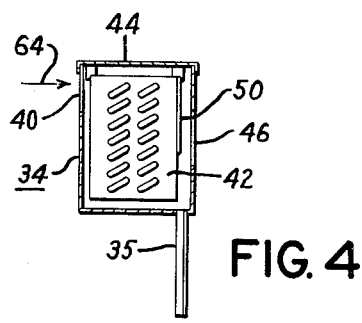
Fig. 4 is an enlarged sectional view of the air cooling compartment.

Beneath the raised portion 26 and between the side rail 30 and the X member 32 there is provided an air tempering unit. This air tempering unit includes a metal box 34 having the projecting members 36 extending toward the X member and being supported by rubber mountings on the adjacent flange of the X member 32. The metal box 34 also has the lateral projecting members 38 resting upon rubber mountings supported by the lower flanges of the side rail 30. The metal box 34 contains an upper opening 40 (see Figure 4) serving as an air inlet for drawing in air beneath the raised portion 26 from the space in front of the front seat 22. The metal box 34 contains a cross-finned type cooling unit or refrigerant evaporator 42 connected by brackets to a removable lid 44. The metal box 34 is provided with a drain 35 for draining any condensed moisture.

The metal box 34 has an opening 46 at the rear for connecting with the inlet of a centrifugal blower 48. To obtain a more even flow of air through the evaporator 42 there is provided on the rear face thereof a metal shield 50 extending downwardly from the top in the amount of about three-fifths the total height of the evaporator 42. This shield 50 forces the air to flow from the top to the bottom of the evaporator 42. The blower 48 is driven by an electric motor 52. The outlet of the blower is connected by a flexible duct 54 with a sheet metal discharge duct means 56 extending from the end of the flexible duct 54 around the end of the front seat 22 and having its outlet arranged to project the air forwardly between the edge of the seat 22 and the adjacent edge of the passenger compartment so that no drafts will contact any of the passengers. The discharge duct 56 is provided with diffusers for spreading the discharge of the air in a vertical direction.

The air is projected principally forwardly with a slight upward angle as indicated by arrow 58. This air then crosses the dash and the windshield to the opposite side of the passenger compartment as indicated by the arrow 60 which allows the cooled air to be tempered by mixing with the other air in the front part of the passenger compartment. Through this air circulation, a blanket of cooled air is kept between the windshield and the passengers. This mixture of air then passes slowly across the front seat 22 as indicated by the arrow 62 and is drawn into the air inlet 40 as indicated by the arrow 64. Through this air circulation, the persons in the front seat are cooled by a gentle circulation of air across their faces and the air is kept at a more uniform temperature. The metal box 34 and the blower 48 are installed with some suitable insulation 66, such as glass wool. This glass wool may be enclosed in waterproof sheeting 68, such as rubber sheeting or rubber coated fabrics.

Upon the opposite side of the X member 32 beneath the raised portion 26 of the front seat 22 there is provided a second air tempering unit 70 containing an identical refrigerant evaporator 72. This air tempering unit 70 is exactly like the air tempering unit previously described, excepting that it is reversed so that the air inlet 74 faces rearwardly so as to draw air beneath the raised portion 26 from the space behind the front seat 22, and the blower 76 is upon the front side of the metal box. This air tempering unit 70 has extensions supported upon rubber mountings upon the adjacent flange of the X member 32 and the side rail 28. The outlet of the blower 76 is connected by a flexible duct 78 with the air discharge duct 80 mounted upon the rear face of the front seat 22.

Figure 2:
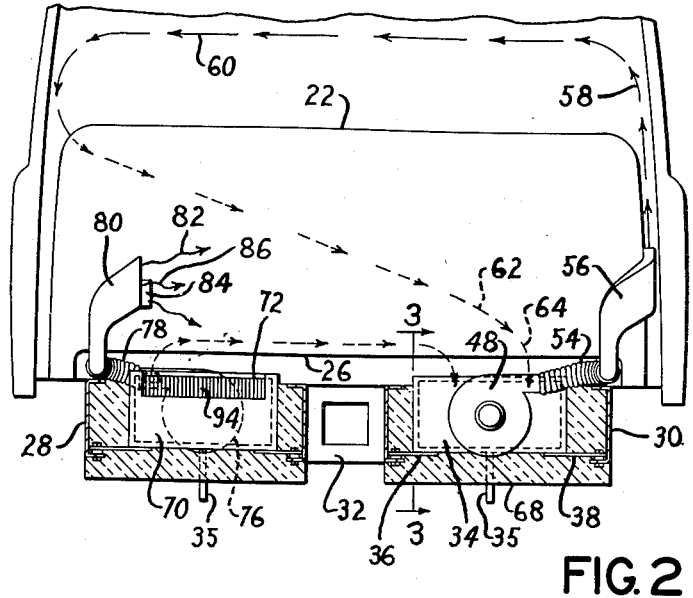
Fig. 2 is a view looking at the rear of the front seat with the air cooling units shown in section.

This discharge duct 80 is directed to discharge cooled air laterally upwardly as indicated by the arrow 82. This air discharge duct 80 is provided with a deflector 84 for discharging some of the air rearwardly at an angle as indicated by the arrow 86. The air discharged from the duct 80 flows laterally behind the front seat 82 and is tempered by mixing with the surrounding air. This air then turns rearwardly as indicated by the arrow 88 and then flows in a gentle manner laterally across the back of the seat to the opposite side of the passenger compartment as indicated by the arrow 90. The air then flows forwardly as indicated by the arrow 92 and enters the air inlet 94 clearly illustrated upon the rear face of the air tempering unit 70 in Fig. 2. This provides a gentle circulation of cool air around the passengers seated upon the rear seat in the rear portion of the passenger compartment without any drafts upon the passengers. It also provides a blanket of cooled air between the windows and the passengers. This type of circulation also keeps the air at a relatively uniform temperature.

In addition to this, the blower 76 has an additional air discharge means 96 which discharges the air forwardly at a slight angle as indicated by the reference character 98 so that there is provided a limited discharge of cool air upon the floor of the car in front of the front seat 22. This discharge of air flows laterally in a gentle manner as indicated by the arrow 111 and enters the air inlet of the air tempering unit 70. This last named air circulation cools the floor of the car, since the floor of this portion of the car is apt to be quite warm because of the heat from the engine of the car and from the torque converter if the car is provided with a torque converter.

The installation of the air tempering units 34 and 70 does not interfere with the adjustability of the front seat 22. The discharge ducts 56 and 80 are fastened to the front seat 22 and the air tempering units are fastened to the frame of the car, but the flexible ducts 54 and 78 are sufficiently flexible to permit ample adjustment of the seat 22. Also, the air tempering units 34 and 70 by leaving a central open space beneath the front seat do not interfere with the heating system installed in the automobile which sends a hot blast of air over the floor from the dash beneath the front seat to the rear of the passenger compartment.

The gasoline engine 113 in addition to furnishing the power for operating the car also furnishes the power for operating the refrigerating system. The engine 113 is provided with a radiator 115 and a fan 117 for drawing air through the radiator. The fan 117 is provided with a pulley driven from the engine by the fan belt 119 which also drives the generator 121. The fan belt 119, or if desired a separate belt, drives the pulley 123 which is connected to an electrodynamic clutch 125 of the general type shown in the Winther Patent 1,982,461 issued November 27, 1934. This electrodynamic clutch, as will be later explained in connection with the wiring diagram in Fig. 5, limits the speed of operation of the refrigerant compressor 127 which it drives. The compressor 127 compresses the refrigerant and the compressed refrigerant is conducted through metal tubing 129 and flexible tubing 131 to a cross-finned condenser 133 located immediately in front of the engine radiator 115. The fan 117 is employed to draw air through the condenser 133 as well as the radiator 115.

The compressed refrigerant condenses in the condenser 133 and is collected in the receiver 135. The refrigerant collected in the receiver 135 flows through the tubing 137 to a filter 139, thence through tubing 141 to a heat exchanger 143. From heat exchanger 143 the liquid refrigerant flows through the tubing 145 to the refrigerant evaporator 42. This evaporator 42 is provided with a thermostatic expansion valve 147 provided with a thermostat bulb located at the outlet of the evaporator 42. The thermostatic expansion valve may be of any suitable type, for example, like the one shown in Patent 2,294,988. The liquid refrigerant also flows through a liquid line 149 to the evaporator 72. This evaporator 72 is likewise provided with a thermostatic expansion valve similar to the valve 147 and similarly applied to its evaporator. The liquid refrigerant evaporates within the evaporators 42 and 72 and is returned through the suction conduits 151 and 153 to the heat exchanger 143 from which the evaporated refrigerant flows through the suction conduit 155 and the flexible tubing 157 to the inlet of the compressor 127. Manually operable shut-off valves 201, 203, 205 and 207 are provided in the refrigerant circuit.

Figure 5:
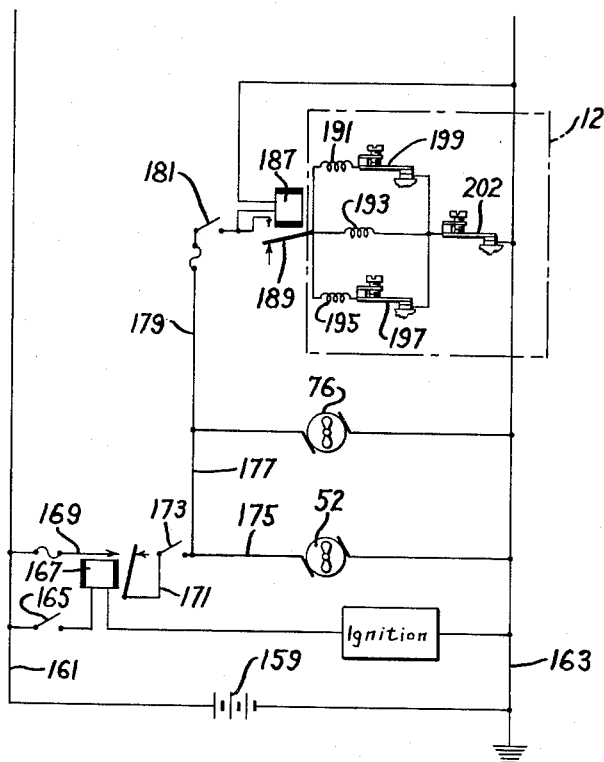
Fig. 5 is a wiring diagram showing the connection of the air cooling controls to the electrical system.
Figure 3:
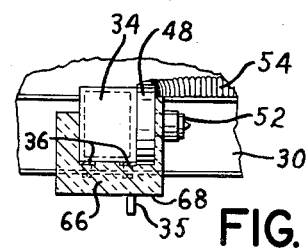
Fig. 3 is a sectional view taken substantially along the line 3—3 of Fig. 2.

Referring now more particularly to Fig. 5, there is shown an electrical system for controlling the electrodynamic clutch 125. This electrical system is energized from the six volt car battery 159 to which are connected the supply conductors 161 and 163. The ignition switch 165 controls the energization of a normally open solenoid 167. The supply conductor 161 is connected by the conductor 169 with one of the contacts of the normally open solenoid 167. The second contact of the solenoid 167 is connected by the conductor 171 to a manual "off" and "on" switch 173 which turns off and on the air conditioning system. This switch 173 is connected by one conductor 175 with the blower motor 52. A branch conductor 177 connects with the motor of the second blower 76. The branch conductor 177 is also connected by the conductor 179 with the high and low pressure control switch means 181.

Preferably this high and low pressure control switch means 181 is of the type shown in Patent 2,259,265. As shown in Fig. 1, this switch means 181 includes one bellows connected by a conduit 183 with the suction line portion 157 and a second bellows connected by a conduit portion 185 to the high pressure conduit 129 connecting the compressor 127 with the condenser 133. When this switch 181 is so connected it will be opened when the suction pressure in the suction conduit 155, 157 reaches a predetermined low point and will close when the pressure in the suction conduit rises a predetermined amount, such as 3 lbs. above the predetermined low point to keep the evaporators 42 and 72 at a suitable temperature. The switch 181 will also be opened if the discharge pressure of the compressor 127 should exceed a predetermined high pressure.

The switch 181 connects with a second normally open solenoid switch 187. The switch 181 also connects with the normally open contacts 189 of the solenoid 187. The contacts 189 connect in parallel with three electric coils 191, 193 and 195 in the electrodynamic clutch 125. When all the electric coils 191, 193 and 195 are energized there is no slipping of the clutch 125. The electric coil 195 is provided with a centrifugally responsive vibrating cutout switch 197 which is set to cutout at about 2000 R. P. M. to deenergize the electric coil 195. When the electric coil 195 is deenergized, there is a slight amount of slippage but the waste heat of the clutch 125 is reduced.

When the speed of the electrodynamic clutch 125 reaches 2500 R. P. M., the second centrifugally responsive cutout switch 199 will open to deenergize the electric coil 191 with which it is connected in series. When the speed of the clutch 125 reaches 3000 R. P. M., the third centrifugally responsive cutout switch 202 will open to deenergize the third electric coil 193 which will completely deenergize the electrodynamic clutch 125. The switch 202 will open and close to deenergize and energize the coil 193 in an amount to keep the speed of driving the compressor 127 at a speed of 3000 R. P. M. as long as the speed of the car engine 113 is maintained at a sufficient speed. Preferably the clutch 125 is driven at one and one-half times the speed of the engine 113.

The system as described provides adequate air conditioning for a passenger car with a gentle flow of air on the passengers. It is installed without any major alteration of the car.

While the form of embodiment of the invention as herein disclosed, constitutes a preferred form, it is to be understood that other forms might be adopted, as may come within the scope of the claims.

What is claimed is as follows:

1. An air conditioning system for an automobile passenger car having a front seat for the driver and passengers and a rear seat in its passenger compartment, two cooling units located beneath the front seat, one of said cooling units having its air entrance nearest the front edge of the front seat for drawing in air from in front of the front seat and a duct means connecting to its air exit nearest to the rear edge of the front seat, the second of said cooling units having its air entrance nearest the rear edge of the front seat for drawing in air from behind the front seat and a second duct means connecting to its air exit nearest the front edge of the front seat, the duct means of said one cooling unit having an air discharge means directed forwardly at the extreme side of the passenger compartment, said second duct means having an air discharge means directed laterally upwardly adjacent the rear side of said front seat, and means for circulating air through said cooling units.

2. An air conditioning system for an automobile passenger car having a seat for the driver and passengers, including an air tempering means beneath said seat having a first air inlet means beneath the seat upon a first side of the car arranged to receive air from the space in front of the seat, said air tempering means having a second air inlet means beneath the seat upon the second side of the car arranged to receive air from the space back of the seat, said air tempering means having an outlet duct means provided with a first air discharge means directed for discharging tempered air forwardly at one end of the seat upon the first side of the car, said outlet duct means being also provided with a second air discharge means directed for discharging air laterally at the rear of said seat, and circulating means for drawing in air through said air inlet means and discharging the air through the air outlet means of said air tempering means.

3. An air conditioning system for an automobile having a seat for the driver and passengers, including a first air tempering means beneath the seat having air inlet means arranged to receive air from the space in front of the seat, said first air tempering means having an outlet duct means provided with a forwardly directed air discharge means located at one end of the seat for discharging tempered air forwardly, a second air tempering means beneath the seat having air inlet means arranged to receive air from the space behind the seat, said second air tempering means having an outlet duct means provided with a laterally directed air discharge means mounted upon the rear face of the seat for discharging air laterally at the rear face of the seat, means for individually controlling said first and second air tempering means and circulating means for said first and second air tempering means for drawing air through said air inlet means and discharging air through said air discharge means.

4. An air conditioning system for an automobile passenger car having a movable seat for the driver and passengers, including an air tempering means beneath the seat having a first air inlet means beneath the seat upon a first side of the car arranged to receive air from the space in front of the seat, said air tempering means having a second air inlet means beneath the seat upon the second side of the car arranged to receive air from the space back of the seat, said air tempering means having outlet duct means fastened to said movable seat provided with a first air discharge means directed for discharging air forwardly at one end of the seat upon the first side of the car, said outlet duct means being also provided with a second air discharge means directed for discharging air laterally at the rear of said seat, said outlet duct means being provided with flexible duct connecting means for connecting said air tempering means to the air outlet means, and blower means for drawing air into said inlet means and for discharging said air into said air outlet means.

5. Air conditioning apparatus for an automobile having a plurality of seats within a passenger compartment, comprising in combination, a first evaporator, first means including a fan for flowing air from the front portion of said passenger compartment over the said first evaporator and for discharging said air into the front portion of said passenger compartment, a second evaporator, second means including second fan means for circulating air from the rear portion of said passenger compartment over said second evaporator and for discharging the air into the rear portion of said passenger compartment, means for individually controlling the cooling of air by each of said evaporators and a common refrigerant liquefying means for supplying liquid refrigerant to said first and second evaporators.

6. Air conditioning apparatus for an automobile having a variable speed engine for driving the automobile comprising in combination, a compressor, a condenser, evaporator means, refrigerant flow connections between said compressor, condenser, and evaporator means, means for flowing air to be conditioned in thermal exchange relationship with said evaporator means, torque transmitting means including a clutch for drivingly connecting said compressor to said engine, said torque transmitting means comprising means for varying the speed of said compressor relative to the speed of said engine, means including an electric switch for controlling said clutch, and means responsive to the pressure of the refrigerant for controlling the operation of said switch.

References Cited in the file of this patent

UNITED STATES PATENTS

| | | |
|---|---|---|
| 1,951,200 | Mullen et al. | Mar. 13, 1934 |
| 1,981,011 | Vernet | Nov. 20, 1934 |
| 2,007,291 | Anderson | July 9, 1935 |
| 2,180,760 | Mayo | Nov. 21, 1939 |
| 2,245,053 | Sanders | June 10, 1941 |
| 2,306,796 | Staley et al. | Dec. 29, 1942 |
| 2,336,089 | Gould | Dec. 7, 1943 |
| 2,430,335 | Hart | Nov. 4, 1947 |
| 2,467,398 | Miller | Apr. 19, 1949 |